(12) United States Patent
Amor et al.

(10) Patent No.: US 10,835,961 B2
(45) Date of Patent: Nov. 17, 2020

(54) TANGENTIAL CUTTING INSERT, CUTTING TOOL WITH A TANGENTIAL CUTTING INSERT, AND METHOD FOR PRODUCING A TANGENTIAL CUTTING INSERT

(71) Applicant: Kennametal Inc., Latrobe, PA (US)

(72) Inventors: Raouf Ben Amor, Fuerth (DE); Igor Kaufmann, Fuerth (DE)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 16/118,732

(22) Filed: Aug. 31, 2018

(65) Prior Publication Data
US 2019/0070669 A1 Mar. 7, 2019

(30) Foreign Application Priority Data

Sep. 1, 2017 (DE) .......................... 10 2017 120 188

(51) Int. Cl.
*B23B 27/10* (2006.01)
*B23B 27/14* (2006.01)
*B23B 27/16* (2006.01)

(52) U.S. Cl.
CPC .... *B23B 27/1622* (2013.01); *B23B 2200/048* (2013.01); *B23B 2200/369* (2013.01); *B23B 2226/125* (2013.01); *B23B 2226/18* (2013.01); *B23B 2226/315* (2013.01)

(58) Field of Classification Search
CPC ...... B23C 2226/00; B23P 15/28; B23P 15/34; B23B 2200/048; B23B 2200/369; B23B 2226/125; B23B 2226/18; B23B 2226/315; B23B 27/1622; B23B 27/20; B23B 27/16; B23B 2226/12; B23B 29/043; B23B 2205/045; F16B 35/005
See application file for complete search history.

(56) References Cited

U.S. PATENT DOCUMENTS

| 3,613,197 A | * | 10/1971 | Stier | ............... B23B 27/065 407/113 |
| 4,169,690 A | * | 10/1979 | Kendra | ............. B23B 27/065 407/103 |
| 5,308,197 A | * | 5/1994 | Little | ................ B23B 27/065 407/101 |

(Continued)

FOREIGN PATENT DOCUMENTS

| JP | 2006167818 A | * | 6/2006 |
| JP | 2006187820 A | * | 7/2006 |
| WO | WO1998001249 A1 | | 1/1998 |

*Primary Examiner* — Sara Addisu
(74) *Attorney, Agent, or Firm* — Larry R. Meenan

(57) ABSTRACT

A tangential cutting insert for a turning tool is described, which comprises a first tangential cutting insert side and a second tangential cutting insert side, wherein one of the tangential cutting insert sides is assigned more than two cutting edges, and the cutting edges are arranged in a star shape about a tangential cutting insert center axis. The tangential cutting insert is produced completely from cubic crystalline boron nitride, polycrystalline cubic boron nitride, polycrystalline diamond, or ceramic. In addition, a cutting tool with such a tangential cutting insert is presented. A method for producing a tangential cutting insert is also explained.

12 Claims, 8 Drawing Sheets

(56) References Cited

U.S. PATENT DOCUMENTS

| | | | |
|---|---|---|---|
| 2011/0150586 A1* | 6/2011 | Fang | B23C 5/2208 407/69 |
| 2012/0099935 A1* | 4/2012 | Hecht | B23B 27/1614 407/100 |
| 2013/0156516 A1* | 6/2013 | Hecht | B23B 27/1622 407/103 |
| 2013/0272807 A1* | 10/2013 | Luik | B23C 5/109 407/11 |
| 2015/0000434 A1* | 1/2015 | Hecht | B23B 29/043 74/55 |
| 2018/0009044 A1* | 1/2018 | Koifman | B23C 3/12 |
| 2018/0071832 A1* | 3/2018 | Hecht | B23B 27/16 |
| 2019/0084053 A1* | 3/2019 | Voge | B23B 27/04 |

\* cited by examiner

TANGENTIAL CUTTING INSERT, CUTTING TOOL WITH A TANGENTIAL CUTTING INSERT, AND METHOD FOR PRODUCING A TANGENTIAL CUTTING INSERT

RELATED APPLICATION DATA

The present application claims priority pursuant to 35 U.S.C. § 119(a) to German Patent Application No. 102017120188.2 filed Sep. 1, 2017, which is incorporated herein by reference in its entirety.

FIELD

The invention relates to a tangential cutting insert for a turning tool, with a first tangential cutting insert side and a second tangential cutting insert side, wherein one of the tangential cutting insert sides is assigned more than two cutting edges, and the cutting edges are arranged in a star shape about a tangential cutting insert center axis. Moreover, the invention relates to a cutting tool with such a tangential cutting insert, as well as a method for producing such a tangential cutting insert.

BACKGROUND

A "tangential cutting insert" is to be understood as a cutting insert that interacts with a workpiece to be machined substantially in a tangential direction of the cutting insert. Such cutting inserts are in particular differentiated from cutting inserts that interact with a workpiece to be machined substantially in an axial direction of the cutting insert. The axial direction generally corresponds to the direction of extension of a fastener, such as a screw by means of which the cutting insert is fastened to a tool main body, or a center axis of the tangential cutting insert. In other words, in a tangential cutting insert, the center axis of the screw tightening the cutting insert extends parallelly to the tool reference plane, whereas the tightening axis extends perpendicularly to the tool reference plane in a normal arrangement.

Tangential cutting inserts of the aforementioned type are known from the prior art.

For example, U.S. Pat. No. 9,103,418 B2 discloses such a tangential cutting insert as well as an associated cutting tool. In this case, the tangential cutting insert has the shape of a five-point star. The cutting edges are respectively arranged on the tips of the points. Stated more precisely, the cutting edges are formed on cutting edge bodies that are connected to a main body of the tangential cutting insert. Normally, a harder material is used for the cutting edge bodies than for the main body.

In producing such a tangential cutting insert, a number of joining operations must be performed that corresponds to the number of points, in which joining operations the cutting edge bodies are attached to the main body of the tangential cutting insert. These are soldered or sintered on, for example. In the process, a precise positioning of the cutting edge bodies on the main body is of decisive importance for the machining precision that is achievable by means of the tangential cutting insert.

While using a known tangential cutting insert, the joints frequently represent a mechanical weak point of the cutting inserts so that the operating parameters are restricted by the maximum load capacity of this point. A reason for this is the comparatively small contact surface between the individual cutting edge bodies and the main body.

SUMMARY

The object of the invention is to further improve tangential cutting inserts of the aforementioned type. In particular, tangential cutting inserts are to be created that can be produced particularly easily and economically and are very mechanically stable. The production costs are generally stated as cost per cutting edge.

The object is achieved by a tangential cutting insert of the aforementioned type, wherein the tangential cutting insert is produced completely from cubic crystalline boron nitride, polycrystalline cubic boron nitride, polycrystalline diamond, or ceramic. The tangential cutting insert can also be called a tangential indexable insert. The first tangential cutting insert side and the second tangential cutting insert side preferably run substantially parallelly. The tangential cutting insert center axis is preferably perpendicular to the two tangential cutting insert sides. Instead of arranging particularly hard cutting edge bodies on a main body as with known tangential cutting inserts, the entire tangential cutting insert is produced according to the invention from a particularly hard material. The tangential cutting insert is preferably one piece. In comparison to the prior art, joining the cutting edge bodies to the main body is accordingly omitted. The tangential cutting insert according to the invention can therefore be produced particularly easily and economically. This holds true in particular for the cost per cutting edge. Moreover, the joints do not exist in comparison to the prior art. The tangential cutting insert is therefore very mechanically stable as a whole. A tangential cutting insert according to the invention can be used for internal machining and/or external machining. Depending on the machining task, one or more cutting edges can be engaged. In addition, such a tangential cutting insert offers the possibility of repairing worn cutting edges, for example by re-grinding. A cutting insert with a particularly long life is thereby created. Considered over its entire life, such a cutting insert is therefore comparatively economical.

The cutting edges of the tangential cutting insert can be designed as cutting corners or cutting edges. The tangential cutting insert can accordingly be used to manufacture a variety of features. For example, cutting corners can be used to produce grooves or threads. They can also be used to manufacture shoulders. Cutting edges can for example be used in processes for turning an inner perimeter or outer perimeter.

The geometric position of each of the cutting edges can in particular be selected relatively to a fastening opening of the cutting insert, and also in particular to the tangential cutting insert center axis, so that it corresponds to an indexable insert standardized in DIN ISO 1832. The advantage is that NC programs for cutting inserts according to the invention that are created for DIN ISO 1832-compliant indexable inserts do not have to be rewritten; the cutting edges are in an identical geometric position relative to the toolholder. The star-shaped arrangement of the cutting edges of the tangential cutting insert can be generated by virtually superimposing a plurality of DIN ISO 1832-compliant cutting inserts, wherein the cutting inserts to be superimposed are respectively rotated relatively to each other about the tangential cutting insert center axis. For example, two substantially square, DIN ISO 1832-compliant indexable inserts can be superimposed and rotated 45° relatively to each other so that a star-shaped arrangement of the cutting edges of the tangential cutting insert with eight points arises.

The tangential cutting insert can be star-shaped. The cutting edges are then respectively arranged on the tips of the points of the star-shaped tangential cutting insert.

The tangential cutting insert can comprise 3 to 32, preferable 6 to 20, cutting edges. A maximum number of cutting edges is desirable for a long life of the tangential cutting insert. Ultimately, the tangential cutting insert can be rotated by a certain angular interval in the event that a cutting edge is worn and another cutting edge can thus be used to machine a workpiece until all the cutting edges of the tangential cutting insert are worn. However, it should be noted that a potential cutting depth tends to decrease with the number of cutting edges; more precisely with the number of points of the star shape. A good compromise between these two effects is achieved for example with a tangential cutting insert that has a star shape with eight points. This tangential cutting insert can be designed as a one-sided cutting insert and then comprises eight cutting edges. If it is designed as a two-sided cutting insert, it comprises 16 cutting edges.

Preferably, the tangential cutting insert has a fastening opening, wherein a fastening opening center axis corresponds to the tangential cutting insert center axis. Fastening openings represent established solutions in the field of cutting inserts or indexable inserts and ensure reliable fastening of a cutting insert to a toolholder. At the same time, such fastening openings can be produced comparatively easily. They generally interact with a fastening screw. When the fastening opening center axis corresponds to the tangential cutting insert center axis, it is located centrally in the tangential cutting insert. Consequently, independently of the cutting edge of the tangential cutting insert which is provided to interact with the workpiece to be machined, the same conditions always prevail mechanically, i.e., with regard to forces and torques. When changing the cutting edge provided for machining, no machining parameters, etc. need to be adapted.

Advantageously, cutting edges are assigned to both tangential cutting insert sides. The tangential cutting insert is then a two-sided cutting insert. Cutting edges are accordingly assigned to an axial top side and an axial bottom side of the tangential cutting insert. By turning or flipping the tangential cutting insert, one can switch between using the cutting edges of the top side and of the bottom side. In contrast to a one-sided cutting insert that only has cutting edges on one side, the number of cutting edges can accordingly be doubled with a geometry that is otherwise substantially the same. As described above, a high number of cutting edges leads to a long cutting insert life and hence to a reduced cost per cutting edge.

According to one embodiment of the tangential cutting insert, the cutting edges are cutting edges and run substantially parallelly to the tangential cutting insert center axis. Such a tangential cutting insert can be used to turn an inner perimeter, to turn an outer perimeter, and/or to turn grooves. It is preferably designed one-sided in this case. The aforementioned turning operations can be performed very economically given the noted properties of the cutting insert.

In another embodiment of the tangential cutting insert, the cutting edges are cutting corners and are respectively arranged along an extension of the tangential cutting insert in the direction of the tangential cutting insert center axis substantially centrally on the tangential cutting insert. Such a tangential cutting insert is particularly effective for turning threads and/or is suitable for turning grooves, wherein these turning operations can be performed very economically. It is preferably designed one-sided.

The cutting corners can each have an edge angle of substantially 90°. Depending on the final contour of the workpiece to be created, all of the angles corresponding to the ISO standard are conceivable. For efficient production, the edge angles can substantially correspond to the final contour of the workpiece to be created.

According to another embodiment, the cutting edges are cutting corners and are respectively arranged along an extension of the tangential cutting insert in the direction of the tangential cutting insert center axis substantially on the edge of the tangential cutting insert. Shoulders can thus be created very effectively. For this purpose, the tangential cutting insert can be designed to be one- or two-sided.

Viewed in the peripheral direction of the tangential cutting insert, the cutting corners can be alternatingly arranged on opposite edges of the tangential cutting insert. In this case, the tangential cutting insert is two-sided. Cutting corners are therefore assigned to both an axial top side as well as an axial bottom side.

Preferably, the cutting corners each have an edge angle less than 90°, in particular substantially 80°. Moreover, all ISO geometries can be implemented. This accordingly ensures that in particular shoulders with a 90° angle can be produced precisely. At the same time, the edges have a high mechanical stability.

Furthermore, the object is achieved by a method for producing a tangential cutting insert according to the invention, comprising the following steps:

a) providing a disk or a ring of cubic crystalline boron nitride, polycrystalline cubic boron nitride, polycrystalline diamond, or ceramic, and b) manufacturing the cutting insert from the disk or ring by grinding, in particular peripheral grinding, or by a laser machining method.

The tangential cutting insert is therefore completely manufactured from a particularly hard material. Moreover, the production of the tangential cutting insert is very easy and economical since in particular the alignment of parts to be joined to each other and joining operations can be omitted in comparison to the prior art. Preferably, only a single production step is therefore necessary to produce a ready-to-use tangential cutting insert starting from a disk- or ring-shaped blank.

A "disk" or "ring" within the meaning of the method according to the invention is also understood to be a pre-shaped component that has a basic shape of a disk or ring.

The disk or ring can be pre-shaped with a similar contour so that the final contour of the cutting edges can preferably be produced by lasering or slight grinding. This results in low production effort and correspondingly low costs.

Preferably, disks are used as the starting materials for comparatively small tangential cutting inserts, and rings are used for comparatively large tangential cutting inserts. Rings have the advantage that the fastening opening already exists. The advantage of disks is that they are somewhat more stable than rings with a corresponding geometry, in particular when the dimensions are relatively small. Efficient production of tangential cutting inserts of any size can thus be achieved.

According to one variant, the disk or ring is produced by means of a pressing method. Disks or rings can in this way be produced very easily, quickly and economically.

Moreover, a rough machining step that comprises a laser machining method or a spark erosion method can be carried out before step b). The methods in step b) can then be called a fine machining step. Combinations of rough and fine machining steps are generally known and established. With such a combination, fast removal of material and a highly precise machining result can be combined.

Moreover, the object is achieved with a cutting tool, in particular a turning tool, with a tangential cutting insert according to the invention. The tangential cutting tool is preferably screwed onto a cutting tool body of the cutting tool and secured against rotation about the tangential cutting insert center axis by means of a rotation blocking element. By successively turning and/or flipping the tangential cutting insert, various cutting edges thereof can be used successively for machining a workpiece. The cutting tool therefore has a particularly long life.

BRIEF DESCRIPTION OF THE DRAWINGS

The invention is explained below with reference to various embodiments which are shown in the accompanying drawings. In the figures.

DETAILED DESCRIPTION

Figure 1:
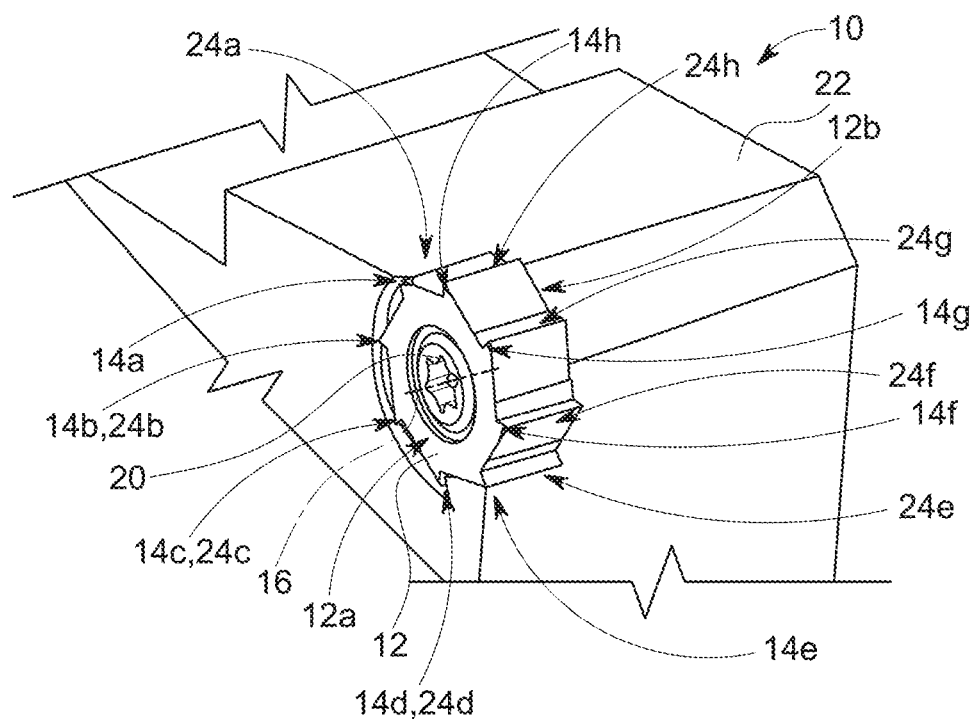
FIG. 1 shows a cutting tool according to the invention with a tangential cutting insert according to the invention which was produced by means of a method according to the invention according to a first embodiment in a perspective illustration.
Figure 2:
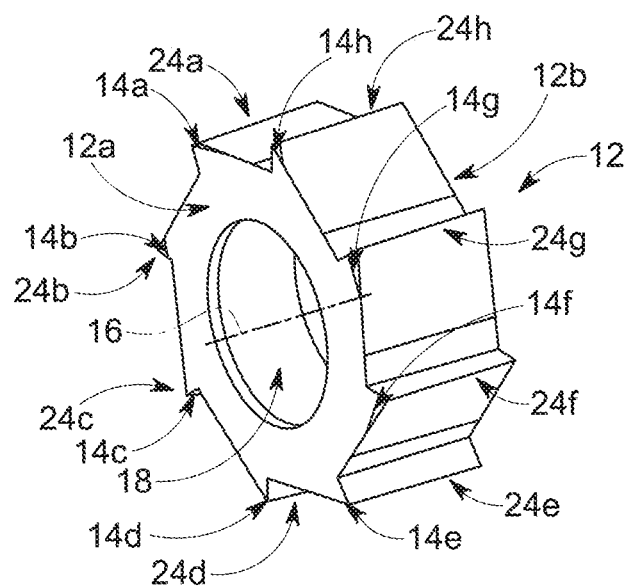
FIG. 2 shows the tangential cutting insert according to the invention from FIG. 1 in a perspective illustration.
Figure 3:
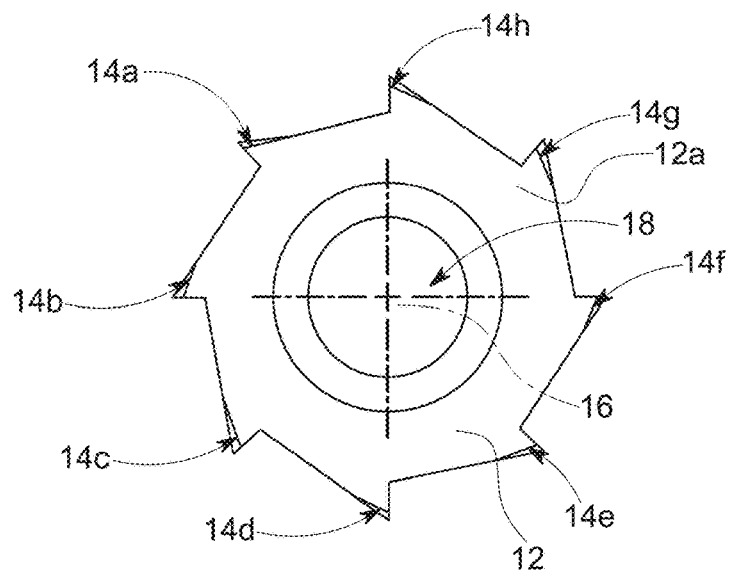
FIG. 3 shows the tangential cutting insert according to the invention from FIGS. 1 and 2 in a side view.

FIGS. 1 to 4 show a cutting tool 10, which is a turning tool in the portrayed embodiment, with a tangential cutting insert 12.

The latter has a first tangential cutting insert side 12a and a second tangential cutting insert side 12b and comprises eight cutting edges 14a, 14b, 14c, 14d, 14e, 14f, 14g, 14h that are arranged in a star shape about a tangential cutting insert center axis 16.

All eight cutting edges 14a to 14h are assigned to the first tangential cutting insert side 12a.

Moreover, the tangential cutting insert 12 is star-shaped and has a fastening opening 18, wherein a fastening opening center axis corresponds to the tangential cutting insert center axis 16.

The tangential cutting insert 12 is connected via a screw 20 arranged in the fastening opening 18 to a tool main body 22 of the cutting tool 10.

In the present embodiment, the cutting edges 14a to 14h are designed as so-called cutting corners.

They are respectively arranged along an extension of the tangential cutting insert 12 in the direction of the tangential cutting insert center axis 16 substantially on the edge of the tangential cutting insert 12.

In other words, the cutting edges 14a to 14h respectively lie in the region of a transition from an axial boundary surface of the tangential cutting insert 12 to a peripheral boundary surface. They are thus provided on an axial edge of the tangential cutting insert 12 (see in particular FIGS. 2 and 4).

Figure 4:
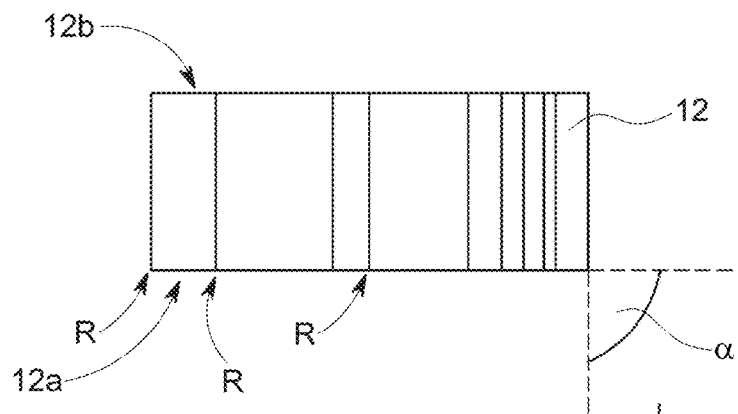
FIG. 4 shows the tangential cutting insert according to the invention from FIGS. 1 to 3 in a plan view.

An edge angle α is substantially 90° (see FIG. 4).

The cutting edges 14a-14h designed as cutting corners can moreover be rounded with a radius R.

Since the cutting edges 14a to 14h are only provided on an axial edge of the tangential cutting insert 12, i.e., are assigned exclusively to the first tangential cutting insert side 12a, the tangential cutting insert can be called a one-sided cutting insert.

The tangential cutting insert can in particular be used for turning an inner perimeter or turning an outer perimeter.

In one variant of the first embodiment, cutting edges 24a to 24h that are designed as cutting edges are provided instead of the cutting edges 14a to 14h that are designed as cutting corners.

The cutting edges 24a to 24h respectively run substantially parallelly to the tangential cutting insert center axis 16.

Such a tangential cutting insert 12 is particularly suitable for turning grooves.

In another variant (not shown), the tangential cutting insert 12 according to the first embodiment is designed as a two-sided cutting insert. This means that in addition to the cutting edges 14a to 14h assigned to the first tangential cutting insert side 12a, another eight cutting edges are provided, which are assigned to the second tangential cutting insert side. These cutting edges are also designed as cutting corners with an edge angle of substantially 90°.

This tangential cutting insert 12 can also be used for turning an inner perimeter or turning an outer perimeter.

In all of the variants, the tangential cutting insert 12 is produced entirely from cubic crystalline boron nitride. Alternatively, it can also be produced from polycrystalline cubic boron nitride, polycrystalline diamond, or ceramic.

Figure 5:
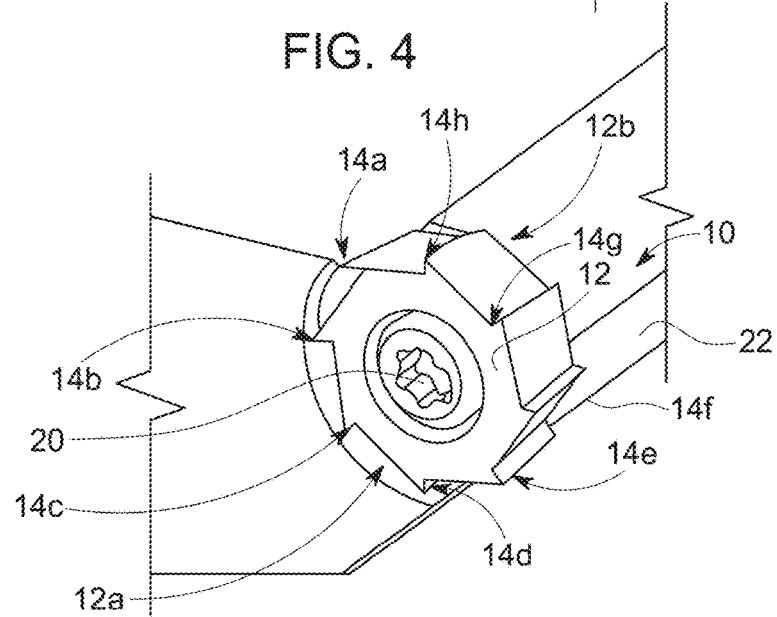
FIG. 5 shows a cutting tool according to the invention with a tangential cutting insert according to the invention which was produced by means of a method according to the invention according to a second embodiment in a perspective illustration.
Figure 6:
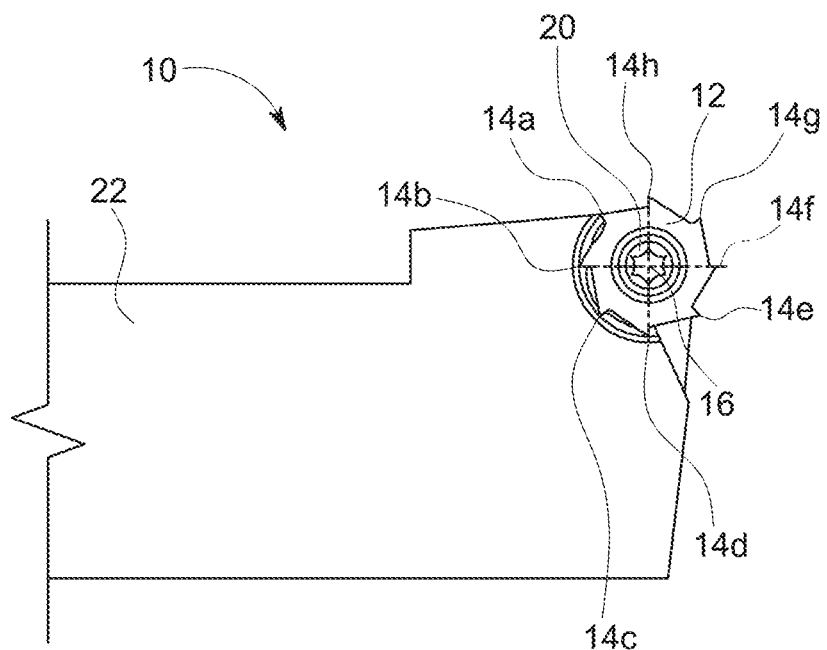
FIG. 6 shows the cutting tool according to the invention with the tangential cutting insert according to the invention from FIG. 5 in a side view.
Figure 7:
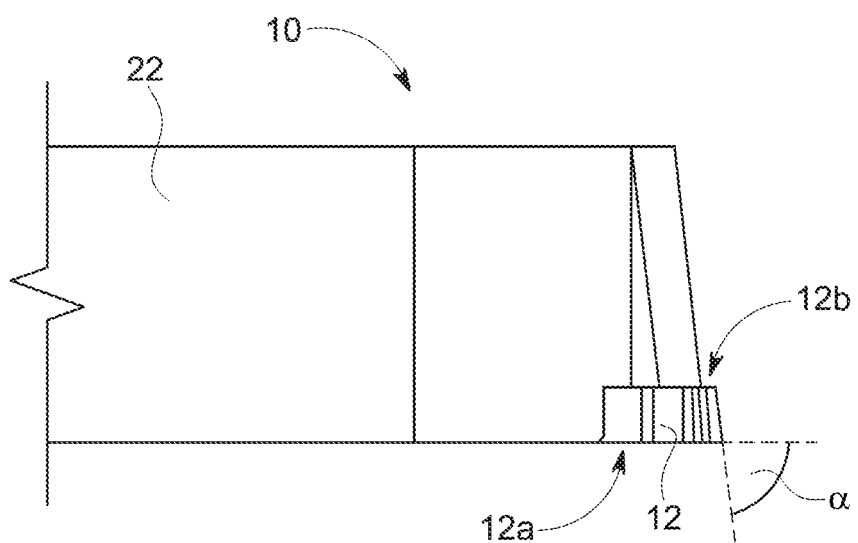
FIG. 7 shows the cutting tool according to the invention with the tangential cutting insert according to the invention from FIGS. 5 and 6 in a plan view.
Figure 8:
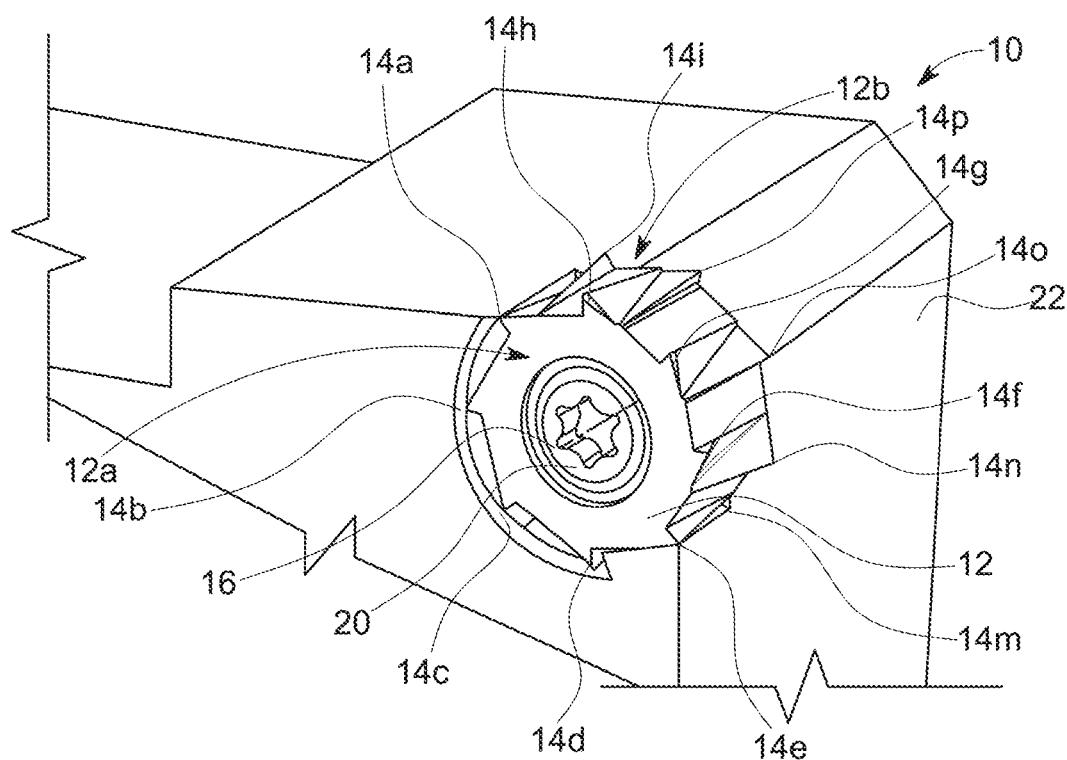
FIG. 8 shows a cutting tool according to the invention with a tangential cutting insert according to the invention which was produced by means of a method according to the invention according to a third embodiment in a perspective illustration.
Figure 9:
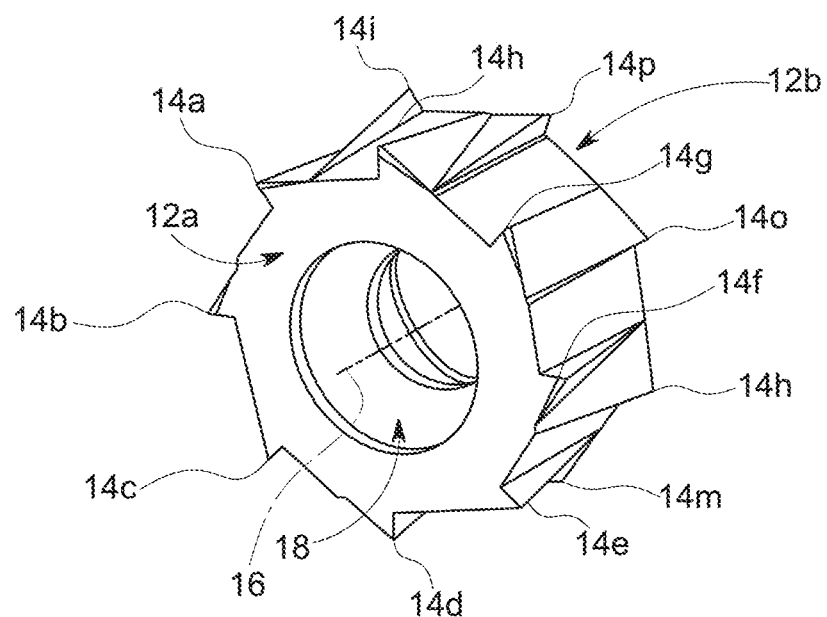
FIG. 9 shows the tangential cutting insert according to the invention from FIG. 8 in a perspective illustration.
Figure 10:
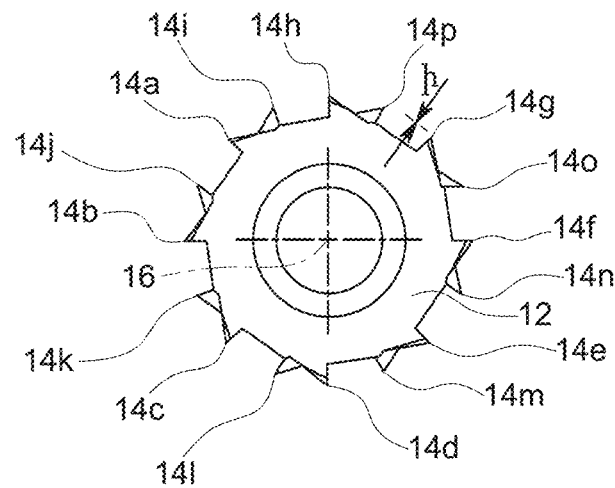
FIG. 10 shows the tangential cutting insert according to the invention from FIGS. 8 and 9 in a side view.
Figure 11:
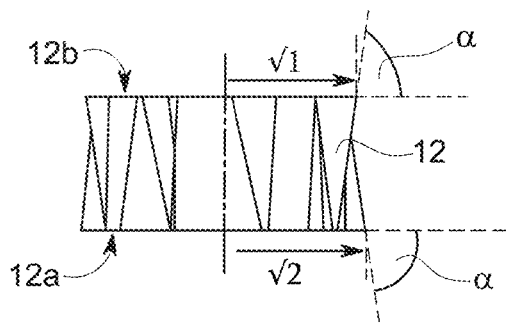
FIG. 11 shows the tangential cutting insert according to the invention from FIGS. 8 to 10 in a plan view.

FIGS. 5 to 7 show a second embodiment of the tangential cutting insert 12. This tangential cutting insert is designed as a one-sided cutting insert with eight cutting edges 14a to 14h designed as cutting corners.

In contrast to the first embodiment, the edge angle α of the cutting edges 14a to 14h is however less than 90°.

In the portrayed exemplary embodiment, the edge angle α is substantially 80°.

In the embodiments in FIGS. 1 to 7, the edge radius is only shown on one side. It is in principle also possible to also provide the edge radius on the other side of the cutting edges. An indexable insert is then obtained, which must however be used in a "right" and a "left" holder depending on which side is to be used.

FIGS. 8 to 11 show a third embodiment of the tangential cutting insert 12. Only the differences from the previous embodiments will be addressed.

The tangential cutting insert 12 is now designed as a two-sided cutting insert. Viewed along the tangential cutting insert center axis 16, cutting edges are therefore provided on both sides of the tangential cutting insert 12.

In the portrayed embodiment, the cutting edges 14a to 14h are assigned to the first tangential cutting insert side 12a and the cutting edges 14i to 14p are assigned to the second tangential cutting insert side 12b.

The cutting edges 14a to 14p are respectively arranged substantially on the edge of the tangential cutting insert 12.

If the tangential cutting insert 12 is viewed in the peripheral direction, the cutting edges 14a to 14p are alternatingly provided on opposite edges of the tangential cutting insert 12.

The height h of a cutting edge that projects in a radial direction beyond the peripheral surface of the cutting insert, i.e., the width of the cutting face, has a magnitude of around 0.2 to 1 mm.

The cutting edges 14a to 14p in the third embodiment are designed as cutting corners. They have an edge angle α of less than 90° which, in the portrayed embodiment, is substantially 80°.

The cutting corners can be rounded (not shown).

Overall, the tangential cutting insert 12 according to the third embodiment therefore has 16 cutting edges 14a to 14p.

The tangential cutting insert 12 according to the second and third embodiment is particularly suitable for producing shoulders.

Since the cutting corners on the side 12a are slightly offset from the cutting corners on the side 12b in the peripheral direction, this results in a clearing that ensures a spacing of the "inactive" cutting corners from the workpiece surface. This can be seen in FIG. 11; the radius $r_2$ is larger than the radius $r_1$.

Assuming that cutting occurs with the cutting corner on side 12a that can be seen furthest to the right, the two right cutting corners on side 12b lie at a distance (viewed in the illustration of FIG. 11) from the center axis that is smaller than the distance at which the active cutting corner is located from the center axis. This is because the cutting corners on side 12b lie "before" and "behind" the projection plane, whereas the active cutting corner lies in the projection plane.

Figure 12:
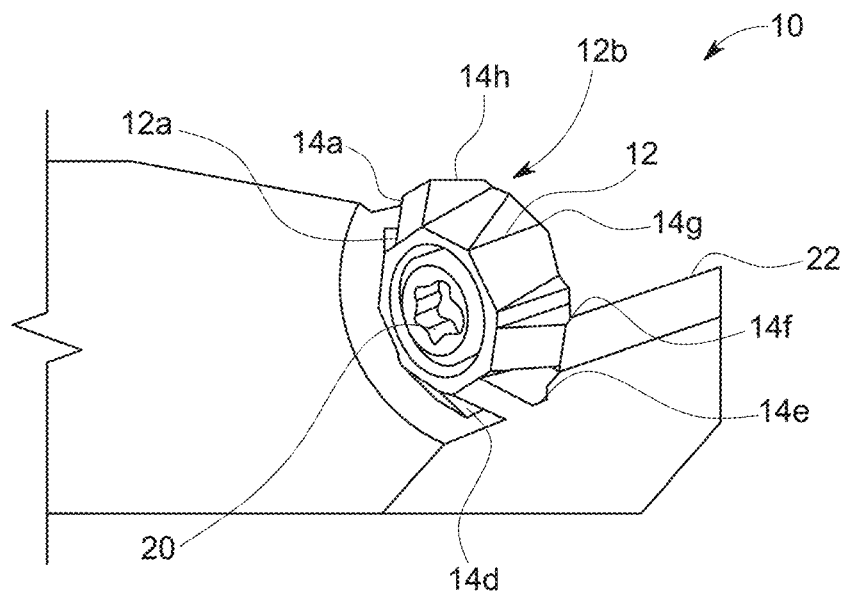
FIG. 12 shows a cutting tool according to the invention with a tangential cutting insert according to the invention which was produced by means of a method according to the invention according to a fourth embodiment in a perspective illustration.

FIG. 12 shows a fourth embodiment of the tangential cutting insert 12. Again, only the differences from the previous embodiments will be addressed.

The tangential cutting insert 12 now has eight cutting edges 14a to 14h designed as cutting corners, which are respectively arranged along the extension of the tangential cutting insert 12 in the direction of the tangential cutting insert center axis 16 substantially centrally on the tangential cutting insert 12.

The cutting edges 14a to 14h have an edge angle α of substantially 90°.

This tangential cutting insert 12 is particularly well-suited for turning grooves or for turning threads.

The tangential cutting inserts 12 according to all of the embodiments can be produced as follows.

Figure 13:
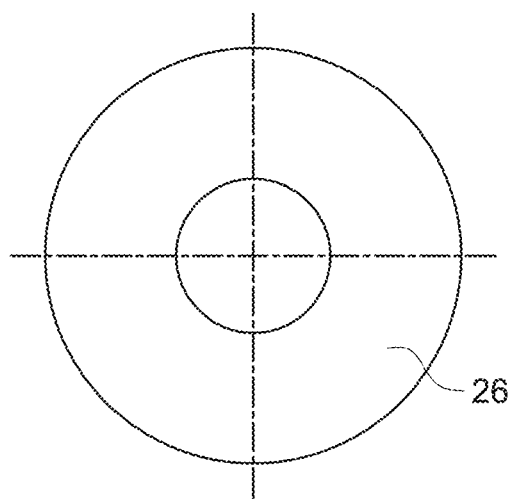
FIG. 13 shows a ring of cubic crystalline boron nitride from which a tangential cutting insert according to the invention can be produced by means of a method according to the invention.

First, a disk or a ring 26 of cubic crystalline boron nitride, polycrystalline cubic boron nitride, polycrystalline diamond, or ceramic is provided (see FIG. 13).

Figure 14:
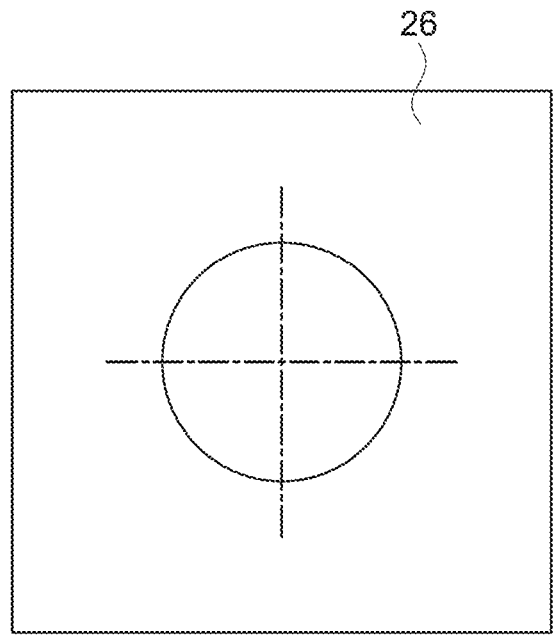
FIG. 14 shows an alternative contour for the ring from FIG. 13.
Figure 15:
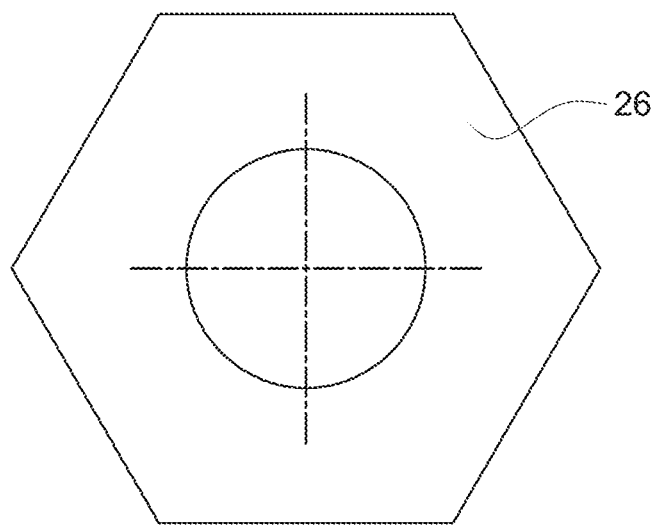
FIG. 15 shows another alternative contour for the ring from FIG. 13.

Alternatively, a "disk" or "ring" with a non-round outer contour that is better adapted to the future contour of the cutting insert can also be produced. For example, a square ring (see FIG. 14) or even a hexagonal ring (see FIG. 15) can be used.

The disk or ring 26 can be produced by means of a pressing method.

The ring 26 only differs from the disk by the presence of a central opening that can be used as fastening opening 18. If a disk is used, the fastening opening 18 must be produced separately.

Then, the tangential cutting insert 12 is manufactured from the disk or the ring 26 by grinding, in particular peripheral grinding, or by a laser machining method.

The above-described manufacturing of the tangential cutting insert 12 can be preceded by a rough machining step that, for example, comprises a laser machining method or a spark erosion method. The above-described manufacturing can then be called a fine machining step.

Figure 16:
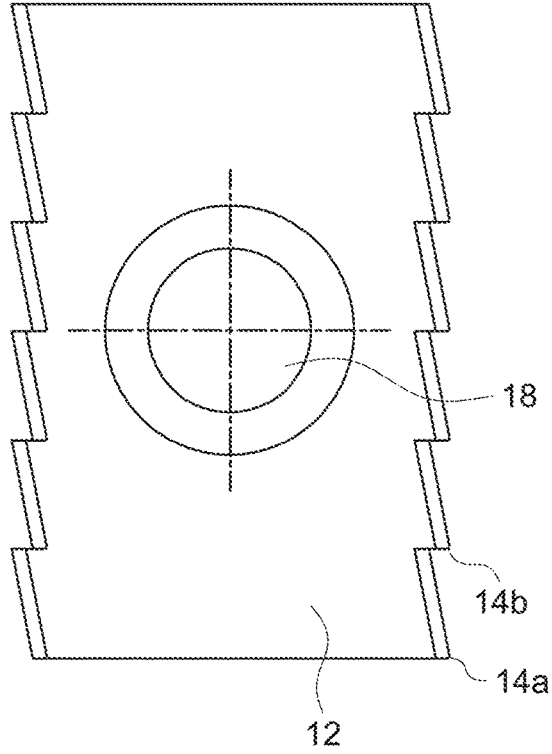
FIG. 16 shows a cutting insert according to another embodiment in a plan view.
Figure 18:
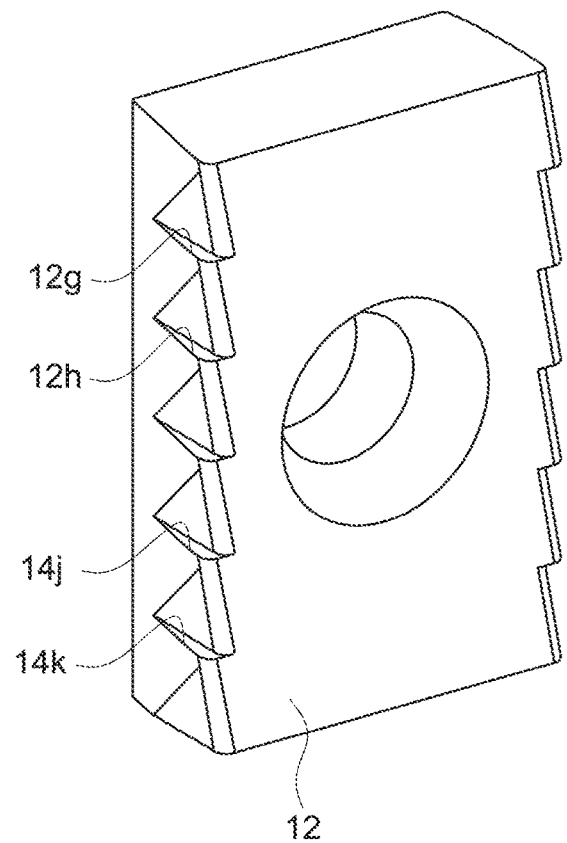
FIG. 18 shows the cutting insert from FIGS. 16 and 17 in a perspective view.
Figure 17:
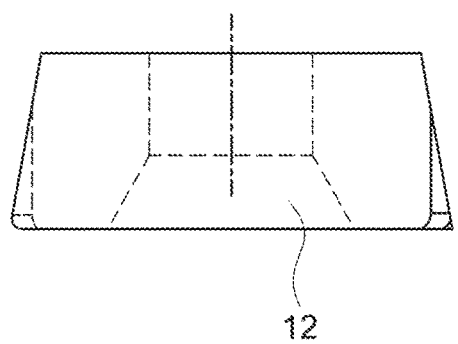
FIG. 17 shows cutting insert from FIG. 16 in a side view.

FIGS. 16 to 18 show another embodiment of the cutting insert 12. For the features and designs known from the preceding embodiments, the same reference symbols are used, and reference is made in this respect to the explanations above.

The basic difference between the cutting insert 12 according to FIGS. 16 to 18 and the preceding embodiments is that it has a substantially rectangular basic shape in a plan view. With this basic shape, the same advantages are achievable as with a substantially circular basic shape. Very many cutting edges that can be used individually for machining a workpiece by further adjusting the cutting insert can be provided on a blank. In contrast to a cutting insert with a round basic shape that is further adjusted in the peripheral direction about the center axis of the fastening opening in order to use the next cutting edge after a cutting edge, the cutting insert according to FIGS. 16 to 18 is further adjusted in a translatory manner, i.e., along the longitudinal axis of the main body (in a vertical direction in FIG. 16).

The invention claimed is:

1. An indexable tangential cutting insert for a turning tool, with a first tangential cutting insert side and a second tangential cutting insert side, wherein one of the tangential cutting insert sides is assigned more than two cutting edges, and the cutting edges are arranged in a star shape about a tangential cutting insert center axis, characterized in that the indexable tangential cutting insert is produced completely from cubic crystalline boron nitride, polycrystalline cubic boron nitride, polycrystalline diamond, or ceramic, and the cutting edges are cutting corners and are respectively arranged along an extension of the tangential cutting insert in the direction of the tangential cutting insert center axis substantially on the edge of the tangential cutting insert, and the cutting corners can be alternately arranged on opposite edges of the indexable tangential cutting insert when viewed in a peripheral direction of the indexable tangential cutting insert.

2. The indexable tangential cutting insert according to claim 1, characterized in that the indexable tangential cutting insert comprises 3 to 32 cutting edges.

3. The indexable tangential cutting insert according to claim 1, characterized in that the indexable tangential cutting insert has a fastening opening, wherein a fastening opening center axis corresponds to the indexable tangential cutting insert center axis.

4. The indexable tangential cutting insert according to claim 1, characterized in that cutting edges are assigned to both tangential cutting insert sides.

5. The indexable tangential cutting insert according to claim 1, characterized in that the cutting edges run substantially parallel to the tangential cutting insert center axis.

6. The indexable tangential cutting insert according to claim 1, characterized in that the cutting edges are cutting corners and are respectively arranged along an extension of the indexable tangential cutting insert in the direction of the tangential cutting insert center axis substantially centrally on the indexable tangential cutting insert.

7. The indexable tangential cutting insert according to claim 6, characterized in that the cutting corners each have an edge angle ($\alpha$) of substantially 90°.

8. The indexable tangential cutting insert according to claim 1, characterized in that the cutting corners each have an edge angle ($\alpha$) of less than 90°.

9. The indexable tangential cutting insert according to claim 1, characterized in that the indexable tangential cutting insert has a circular basic shape in a plan view along the center axis of a fastening opening.

10. The indexable tangential cutting insert according to claim 1, characterized in that the indexable tangential cutting insert has a rectangular basic shape in a plan view along the center axis of a fastening opening.

11. The indexable tangential cutting insert according to claim 1, characterized in that the indexable tangential cutting insert comprises 6 to 20 cutting edges.

12. A cutting tool with an indexable tangential cutting insert according to claim 1.

* * * * *